United States Patent [19]

Fujii et al.

[11] Patent Number: 5,475,213
[45] Date of Patent: Dec. 12, 1995

[54] OPTICAL INFORMATION PROCESSING ELEMENT AND A LIGHT-TO-LIGHT CONVERTING DEVICE

[75] Inventors: Akiteru Fujii, Machida; Mitsuru Yoneyama, Yokohama; Tetsuo Murayama, Machida, all of Japan

[73] Assignee: Mitsubishi Chemical Corporation, Tokyo, Japan

[21] Appl. No.: 139,752

[22] Filed: Oct. 22, 1993

[30] Foreign Application Priority Data

Oct. 22, 1992 [JP] Japan .................................. 4-284672
Oct. 22, 1992 [JP] Japan .................................. 4-284675

[51] Int. Cl.$^6$ .................................................. H01J 40/14
[52] U.S. Cl. .................................. 250/214 LA; 369/284
[58] Field of Search ...................... 250/214 LA, 214.1; 369/13, 275.2, 284; 365/106, 109, 110; 359/240, 296

[56] References Cited

U.S. PATENT DOCUMENTS

| 4,695,717 | 9/1987 | Hirai et al. . |
| 4,984,198 | 1/1991 | Kobayashi et al. . |
| 5,055,739 | 10/1991 | Thioulouse ........................ 250/214 LA |

FOREIGN PATENT DOCUMENTS

| 0482920 | 4/1992 | European Pat. Off. . |
| 4-5636 | 1/1992 | Japan . |
| 4-90015 | 3/1992 | Japan . |

OTHER PUBLICATIONS

Denshi Gijutsu (Electronics Technology), Jan., 1992, pp. 25–27.
"Parallel optoelectronic realization of neural networks models using CID technology", Applied Optics, vol. 27, No. 21, Nov. 1, 1988, pp. 4354–4355.
"Optoelectronic associative memory using an advanced optical neurochip", Appl. Optics, vol. 30, No. 11, Apr. 10, 1991, pp. 1318–1330.
"Optical learning neurochip with internal analog memory", Applied Optics, vol. 32, No. 8, Mar. 10, 1993, pp. 1264–1274.
"Optical Neural Device Based on Memory–Type Organic Photoconductors", Abstracts & Agenda/1993 Meeting of The International Society for Molecular Electronics and Biocomputing, Akiteru Fujii, et al., p. 21.
"Memory effect on an organic photoconductor and its application to a neuron model", Appl. Phys. Lett. 62 (6), Feb. 8, 1993, Akiteru Fujii, et al., pp. 648–650.
"Artificial Neural Device Based on Organic Photoconductors", Extended Abstracts/The 4th International Symposium on Bioelectric and Molecular Electronic Devices, Nov. 30–Dec. 2, 1992, A. Fujii, et al., pp. 62–63.
Japanese Journal of Applied Physics, vol. 30, No. 128, Dec. 1991, pp. 3887–3892, Koji Akiyama, et al., "A New Optical Neuron Device for All–Optical Neural Networks".
Patent Abstracts of Japan, vol. 8, No. 257 (P–316) (1694), Nov. 24, 1984, JP–A–59 128 520, Jul. 24, 1984.
Patent Abstracts of Japan, vol. 005, No. 013 (P–046), JP–A–55 143 558, Nov. 8, 1980.

*Primary Examiner*—Stephone B. Allen
*Attorney, Agent, or Firm*—Oblon, Spivak, McClelland, Maier, & Neustadt

[57] ABSTRACT

An optical information processing element characterized by having a photoelectric and a memory layer provided with a function holding an electricity-conducting property which has been changed by radiation of light having a constant wavelength between electrodes at least one of which is provided with a light-transmitting property.

20 Claims, 4 Drawing Sheets

OPTICAL INFORMATION PROCESSING ELEMENT AND A LIGHT-TO-LIGHT CONVERTING DEVICE

The present invention relates to an optical information processing element and a light-to-light converting device which is new and is suitable for visual information treatment such as pattern recognition, and a neurocomputer, capable of changing response sensitivity with respect to a light signal by a control light and capable of memorizing the changed response sensitivity inside of the element for a long time.

The light-to-light converting device which can issue an optical output with respect to an input of an optical information, can be expected to adapt to an image record, an optical computer, an optical writing projection device and the like. Among them, the optical computer attracts attention owing to its parallelism, that is, a capacity capable of simultaneously transmitting and treating many informations, its superiority in wirings, cross talk and the like, its analogue performance, and its direct treating capacity of image.

On the other hand, in recent times, an information processing which has been considered to be essentially characteristic to a brain or a nervous system, of association memory, learning and the like which has conventionally regarded to be difficult, has considered to be possible. Further, many trials have been performed wherein a neural network is realized as hardware.

Especially, much expectation has been given to an optical neural network and an optical neurocomputer composed of component units having a light-to-light converting function, in view of advantages in the parallelism of light, that is, a capacity of simultaneously transmitting and treating many informations, the superiority in wirings, cross talk and the like, the analogue performance, the direct treating capacity of images and the like.

As the basic functions required for a neural element which is a component unit of the neural network, the following three conditions are pointed out.

(1) The element is provided with input units of information, Further, it is preferable that many input units are provided to a single element.

(2) The element is provided with a memory unit of information. Especially, it is necessary for the neural element, that a portion corresponding to a synapse of a nerve cell of a living body, which can perform weighting with respect to each input information, in response to the input information. Further, it is more preferable that the weighting can be changed in an analogue form, and is provided with a characteristic wherein the changed value can be memorized and held for a long time.

(3) The element is provided with an output unit of information. It is preferable that the element is provided with a nonlinear output characteristic wherein the weighted input informations are added together and the added value is outputted when it exceeds a constant threshold value.

There is an artificial neuron model shown in FIG. 7, as a suggested model of the neural element. In this model, an i-th input signal $u_i$ is multiplied by a weight coefficient $w_i$ at a portion corresponding to a synapse, the weighted signals are all added together, and an output v is issued in accordance with a nonlinear function g(x) (delta function, sigmoid function or the like) at an output unit.

$$v = g(\Sigma w_i \cdot u_i) \quad (1)$$

It is considered to be indispensable that the weight coefficient $w_i$ is changeable in an analogue form, and the degree of weighting with respect to the input signal is changed and held, to achieve information processing such as learning, memorizing, recognizing and the like. Further, it is preferable for the neural element which is a component unit of an optical neural network or an optical computer, that all the controls of input, output and weight coefficient can be performed by light, owing to the superiority of information processing by light, as mentioned above.

In the development of the neural element in accordance with such a model, the key-point is how to achieve the portion corresponding to the synapses of a living body. As an example, there is a method of controlling the transmission of light by a spatial light modulator, as is described in Applied Optics, 1988, 27, p. 4354. According to the method of employing such a spatial light modulator, it is possible to perform the weighting corresponding to the weight coefficient $w_i$ in the above equation (1) by the amount of the transmission of light. However, it is necessary to control the transmittance of light from an outside system, the value of the controlled transmission can not be memorized without an outside calculating device or the like, and there is a limit in a range of change in the transmission which can be achieved by the spatial light modulator, that is, a contrast between before and after learning.

Further, as is disclosed in Applied Optics, 1991, 30, p. 1328, a trial has been performed wherein the weighting is achieved by modulating photosensitivity, that is, a degree of an electric response with respect to a light signal, by applying a control voltage to a light receiving element composed of a photodiode from an outside system. However, even in this element, the use of the outer calculating device is indispensable, since it is not provided with a memory function.

As an element provided with a memory function, an element of a memory function incorporating type is pointed out, which is shown in Applied Optics, 1993, 32, p. 1264. In this element, it is considered that the detecting sensitivity with respect to a signal light is increased and held by an influence of a space charge which is formed by irradiating with control light to a junction portion that is formed by a metal-GaAs junction, and the weighting is performed by using the change of the detecting sensitivity. However, the increase in the detecting sensitivity is only several times of its original value and the increased detecting sensitivity decays in approximately 20 minutes, which is not considered to be sufficient as a memory function.

Further, it is necessary for achieving an optical neural network or an optical computer, that, in addition to an element of a portion corresponding to a synapse, the element which is a component unit, is a light-to-light converting type provided with an optical input-output converting characteristic. As an example of a light-to-light converting element, there is a spatial light modulator employing a material having a photoconductive effect, wherein an element employing a photoconductive Pockel's effect such as in a bismuth silicate, a liquid crystal light valve, and the like, a combination of a microchannel plate and an photorefractive crystal or the like.

FIG. 8 shows a liquid crystal light valve, wherein reference numerals 13 and 14 designate glass plates, 15 and 16, transference electrodes, 17, a photoconductive layer, 18, a light shielding layer, 19, a dielectric mirror, 20 and 21, liquid crystal orientation layers, 22, a nematic liquid crystal layer, 23, a power source, WL, a writing light, and RL, a reading light. The impedance of the photoconductive layer is lowered by applying a voltage on the liquid crystal light valve followed irradiating with the writing light to the photoconductive layer, whereby the transmittance of the liquid crystal layer is changed by a photoconductive effect by which the voltage applied on the liquid crystal increases. Accordingly, an output can be read out by the reading light.

Further, as a light-to-light converting element having a memory performance, for instance, an element is known which employs a memory in use of a hysteresis and a bistable function of a liquid crystal. However, as a neural element, it is necessary that an output signal is produced only when there is an input signal, and in outputting, a nonlinear response performance is required wherein the output is performed only when the input exceeds a certain amount. For instance, when a liquid crystal having a memory performance is employed in a display unit issuing an output signal, the output signal continues issuing once an information is memorized irrespective of the presence or the absence of the input signal. Therefore, the element can not be employed as a neural element.

Further, it is necessary for employing such a light-to-light converting type element as a neural element, that the element per se is provided with an analogue memory function. That is, it is necessary that the combination weighting of a synapse is easily controlled by a continuous value, which is difficult for a conventional element. Therefore, it is expected to develop a light-to-light converting element which is provided with an analogue memory function capable of continuously controlling the combination weighting of a synapse.

With regard to materials, almost all the materials which were employed in a neural element have been an extension of a material of a conventional inorganic semiconductor element which is an inorganic semiconductor material such as Si, GaAs or the like. In fact, almost all the elements employed in the general electronics use, make use of a function of an inorganic material except auxiliary parts and the like.

In recent years, it has been clarified that, in case of employing an organic material, the durability which has conventionally been regarded as a defect in case of employing an organic material, is comparable, and is often superior to that in case of employing an inorganic material, by optimizing the material or the condition of use. Research has actively been performed wherein the function of an organic material is applied in the electronics field.

As stated above, almost all the conventional neural elements depend on an external device and the element per se is not provided the memory function, as in a case wherein the control of the weight coefficient with respect to an input information is performed by the operation of an outer instrument, or the memory of the weight coefficient is performed by an external calculating device. Further, even if the element has the memory function, it is provided with a defect wherein the hold time of memory is extremely short or the difference between a value in the memory time and that in the non-memory time is small, which is impertinent for the practical use. Further, almost all the materials employ an inorganic semiconductor, and due to the cost or the complexity in manufacturing, an element has been desired which can be manufactured easily and inexpensively. Further, the conventional light-to-light converting element or device is insufficient as a neural element, for achieving an optical neural network or an optical computer, since it is not provided with the analogue memory performance necessary for the portion corresponding to the synapse combination.

It is an object of the present invention to solve the above problems and to provide an optical information processing element and a light-to-light converting element which incorporates a memory function that has been difficult to manufacture, and is provided with an excellent memory holding function, and which is provided with functions necessary for a neural element.

In the drawings:

FIG. 1 is a diagram showing an example of the construction of a light-to-light converting device according to the present invention. In FIG. 1, numerals 1 and 2 designate glass plates, 3 and 4, transparent electrodes, 5, a memory layer, 6, a photoelectric layer, 7, a dielectric mirror, 8 and 9, liquid crystal orientation layers, 10, a liquid crystal layer, 11, a polarizing layer, 12, a power source, IL, an incident light, CL, a control light, and RL, a reading light;

Figure 8:
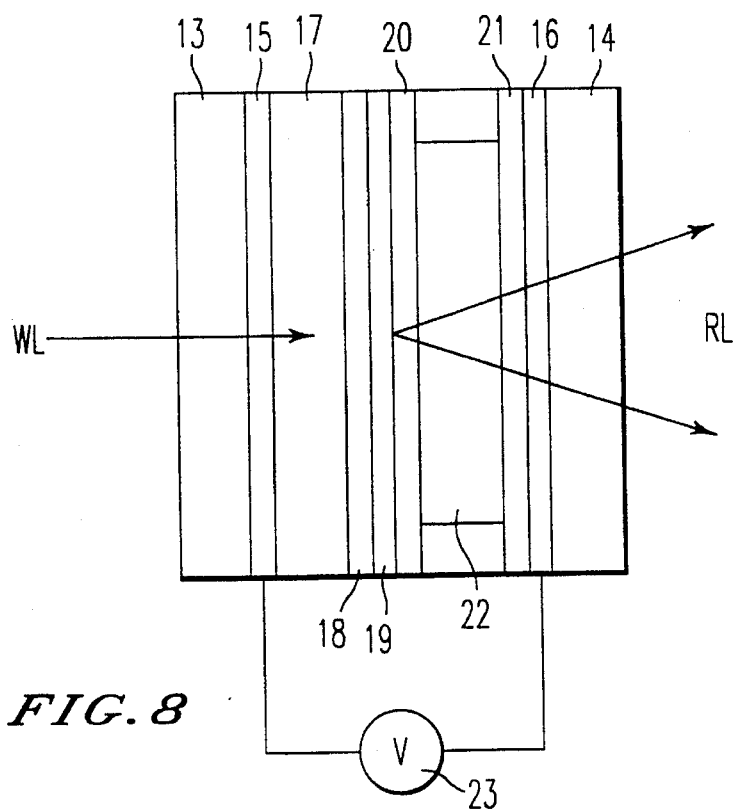
Figure 7:
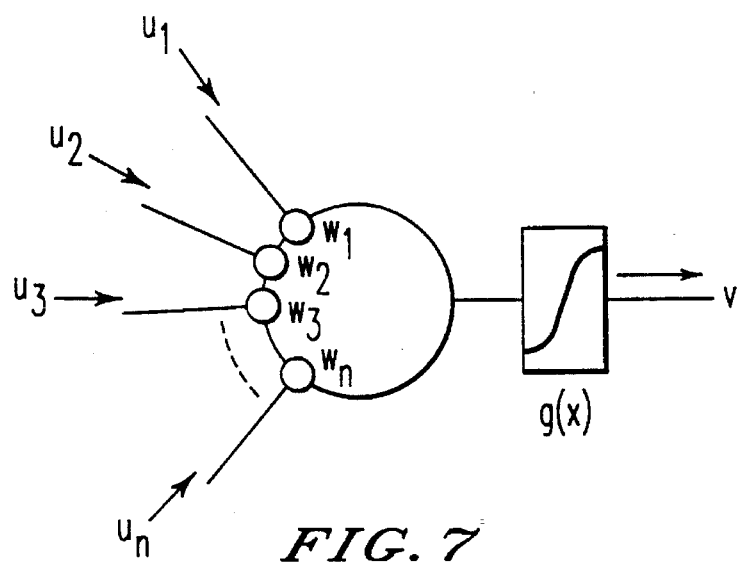

FIG. 7 is a diagram showing a neuron model, wherein $u_1$ through $u_n$ designate input signals, $w_1$ through $w_n$, combination weights of synapses, v, an output signal, and $g(x)$, an output function; and FIG. 8 is a diagram showing the construction of a liquid crystal light valve, wherein 13 and 14 designate glass plates, 15 and 16, transference electrodes, 17, a photoconductive layer, 18, a light shielding layer, 19, a dielectric mirror, 20 and 21, liquid crystal orientation layers, 22, a liquid crystal layer, 23, a power source, RL, a reading light, and WL, a writing light.

First, an explanation will be given to an optical information processing element of this invention. The information processing element of this invention is characterized by having a photoelectric layer, and a memory layer having a function of holding an electricity conducting property which has been changed by light irradiation of a constant wavelength, even after shielding the light, between electrodes at least one of which is provided with the light-transmitting property.

First, an explanation will be given to the electrode. The electrode is formed on a substrate as a conductive thin film layer. As the substrate, a plate of quartz or glass, a metal plate or a metal foil, a plastics film or sheet and the like are employed. However, a glass plate, transparent plastic (polyester, polymethacrylate, polycarbonate) plate and the like are preferable. A metal plate or the like which can be employed as the electrode, can also be employed as the substrate.

As a material for forming the electrode, normally, aluminum, gold, silver, platinum, cadmium, nickel, indium, palladium, tellurium or other metal, an oxide of a metal of indium and/or tin and the like, copper iodide, carbon black, and conductive resins of poly(3-methylthiophene), polypyrrole and the like are employed.

The conductive thin film layer is normally formed by the sputtering method, the vacuum deposition method or the like, in case wherein the material forming the electrode is a metal or a metal oxide. However, the electricity-conductive thin film layer can be formed by the other methods, depending on the kind of material forming the electrode. For instance, in case of a metal particle of silver or the like, fine particles of copper iodide, carbon black, or an electricity-conductive metal oxide, a powder of an electricity-conductive resin and the like, the electricity-conductive thin film layer can be formed by a method wherein the material forming the electrode is painted on the supporter after it is dispersed in a pertinent binder resin solution. Further, in case of an electricity-conductive resin, it can directly be formed on the substrate by the electrochemical polymerization. The electricity-conductive thin film layer can be laminated by different substances.

Although there is no special restriction in the thickness of the electricity-conductive thin film layer, it is preferable that the thickness is not less than 50 Å for achieving uniform electricity conducting property. On the other hand, in case wherein the light-transmitting property is required, it is necessary that the thickness is not larger than a film thickness satisfying the transmittance. The film thickness is normally not larger than 100 μm even in case of the painting method wherein the film thickness increases. In this invention, it is necessary that at least one of the electrodes is a light-transmitting electrode. It is not always necessary that the light-transmitting property covers the whole wavelength range. However, the light-transmitting property is required at least in the wavelength range of light which is absorbed by the memory layer and the photoelectric layer. The higher the transmittance of light, the more preferable the efficiency of a irradiating light. The transmittance is necessary to be at least not less than 10%, not less than 30% in the practical use, and preferably not less than 60%.

Next, an explanation will be given to the photoelectric layer and the memory layer which are formed between the electrodes.

The photoelectric layer is composed of a photoconductive material which generates electric charge carriers by the separation of positive and negative electric charges by absorbing light, which is formed along with insulative materials of a binder resin, a long-chain alkyl fatty acid and the like, carrier transporting materials of aromatic amine, hydrazone compound and the like, and other additives.

As the photoconductive material, photoconductive materials which are normally applied in an electrophotography or a solar cell or the like, are employed. As an inorganic photoconductive material, amorphous selenium, selenium alloy of selenium-tellerium, selenium-arsenic and the like, amorphous silicon, cadmium sulfide, zinc oxide and the like are pointed out. As organic photoconductive materials, various kinds of coloring materials or pigments are pointed out. As these examples, compounds which are known by public literature as an electro-optical converting coloring material, an electric charge carrier forming material and the like are pointed out.

As examples of public literature, there are "Basic and Application of Electric Photography Engineering", p.p. 437 to 448 (edited by the Society of Electronic Photography, Corona-sha, 1988), Transaction of Coloring Material Institute, Vol. 47, p.p. 594 to 604 (Maruyama, Katsuji, 1974), "LB Film and Electronic", p.p. 193 to 204 (CMC, 1986), "Organic Electronic Materials", p.p. 94 to 101 (The Society of Applied Physics, Ohm-sha, 1990) and the like.

As examples of these compounds, coloring materials of a polypyrin group, a cyanin group, a merocyanin group, a pyrilium group, a thiapyrilium group, a triallylmethane group, a squarylium group, an azulenium group and the like, condensed ring group coloring materials of perylene group, a polycycline quinone group, a pyrrolopyrrole group and the like, phthalocyanise coloring material, azoic coloring material and the like are pointed out. As phthalocyanine group coloring materials, non-metallic phthalocyanine group coloring material and various crystal type coloring materials of phthalocyanines coordinated with a metal of copper, vanadium, indium, titanium, aluminium, tin, magnesium and the like, are pointed out. As azoic coloring materials, mainly a bis-azo group, a bisazo group, and a trisazo group coloring material are employed in a form of pigment particles.

The memory layer is composed by dispersing a low molecular weight compound having the hole-transporting property which is provided with at least one nitrogen atom in the molecule and a compound having a memory property providing function which holds the electricity-conductive property that has been changed by the irradiation of light, even after shielding light.

First, an explanation will be given to the low molecular weight compound having the hole-transporting property.

The low molecular weight compound having the hole-transporting property, operates as a transporting carrier of holes which is an electric charge carrier of a memory layer. The hole-transporting phenomenon can be regarded as the transfer of electrons between molecules or an oxidation and reduction reaction wherein an electron donor compound having a small ionization potential is suitable to an effective hole-transportation.

In view of the above point, in this invention, the compound having at least one nitrogen atom in the molecule, is preferably employed as the hole-transporting low molecular weight compound. Especially, a compound wherein a nitrogen atom combines with the π electron conjugate system and the orientation between molecules is excellent.

Further, as forms of nitrogen atoms, an amino group which directly combines with an aromatic hydrocarbon or an aromatic heterocycle by an alkylamino group such as an ethylamino group, an allylamine group such as a diphenylamino group and the like, and similarly, a hydrazo group or a hydrazono group which directly combines with an aromatic hydrocarbon or an aromatic heterocycle are pointed out, and as another example, a nitrogen atom composing heterocycle is pointed. As examples of heterocycles, carbazole, indole, pyrazole, pyrazoline, oxazole and the like are pointed out.

In the above hole-transporting low molecular weight compound, the manufacturing is easy compared with a high molecular weight compound, the removal of impurities by refining is easy, and therefore, the lowering of the memory characteristic by forming traps or the like due to the impurities, is reduced. Further, in the low molecular weight compound, it is easy to enhance the mobility of holes by increasing the content in a memory, since its compatibility with a binder polymer is generally excellent.

In this invention, as a hole-transporting low molecular weight compound, especially, a hydrazone compound shown by the following general formula (1) is preferably employed.

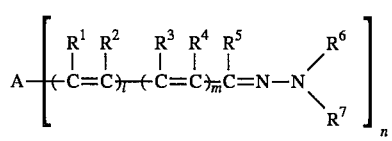
(I)

In the general formula (I), A is a monovalent or divalent organic group containing at least one aromatic hydrocarbon ring or an aromatic heterocyclic ring, and these rings may have substituents. Specifically, organic groups described in the following (a) through (d) are pointed out as A.

(a) A monovalent or a divalent organic group derived from benzene, naphthaline, anthracene, pyrene, perylene, phenanthrene, fluoranthene, acenaphthene, acenaphthylene, azulene, fluorene, indene, tetralin, naphthacene or the like. The organic group is an example containing at least one aromatic hydrocarbon ring.

(b) A monovalent or a divalent organic group derived from pyrrole, thiophene, furan, indole, carbazole, pyrazole, pyridine, acridine, phenazine, benzothiophene, benzofuran or the like. The organic group is an example containing at least one aromatic heterocyclic ring.

(c) A monovalent or a divalent organic group derived from a compound wherein the respective organic groups of the above (a) and (b) are directly combined. For instance, biphenyl, terphenyl, phenylanthracene, bithiophene, terthiophene, bifuran, thienylbenzene, thienylnaphthaline, pyrrolylthiophene, N-phenylcarbazole or the like is pointed out.

(d) A monovalent or a divalent organic group derived from a compound wherein the respective organic groups of the above (a) through (c) are combined through a combining group. As a combining group, an alkylene group which may have substituents shown by the following general formulas or a divalent organic group shown by the general formulas is pointed out. Further, a combination group integrated with such alkylene group or groups and a divalent organic group is pointed out.

Example of combining groups: alkylene group

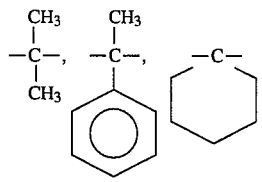

Example of combining groups: divalent organic group

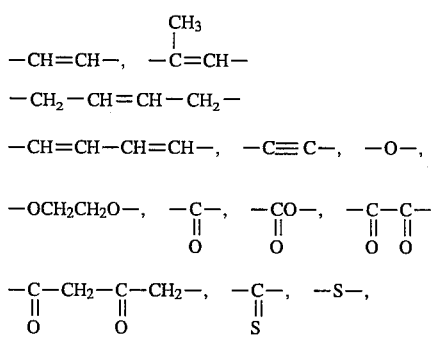

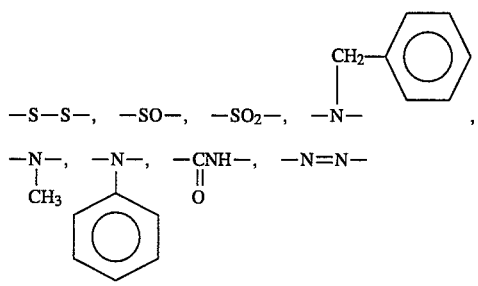

As a specific example of an organic group corresponding to (d), a monovalent or a divalent organic group derived from a compound wherein the above aromatic ring or heterocyclic ring forms a condensed ring by a combining group or groups, for instance, xanthene, thioxanthene, indoline, phenothiazine, a compound shown by the following general formula or the like is pointed out.

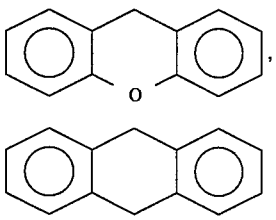

Further, as a specific example of an organic group corresponding to (d), a monovalent or a divalent organic group derived from diphenylmethane, stilbene, tolan, 1,4-diphenylbutadiene, diphenyl ether, diphenyl sulfide, N-methyldiphenylamine, triphenylamine, azobenzene or the like, is pointed out. Further, instead of a benzene ring in these organic groups, an organic group wherein the other aromatic ring or heterocyclic ring is combined by a combining group or groups, or the like is pointed out.

As substituents which the aromatic hydrocarbon ring and/or the aromatic heterocyclic ring in (a) through (d) may have, for instance, lower alkyl groups of a methyl group, an ethyl group, a propyl group, a butyl group, a hexyl group or the like, lower alkoxyl groups of a methoxy group, an ethoxy group, a butoxy group or the like, aralkyl groups of an allyl group, a benzyl group, a naphthylmethyl group, a phenethyl group or the like, allyloxy groups of a phenoxy group, trioxyl group or the like, allylalkoxyl groups of a benzyloxy group, a phenethyloxy group or the like, allyl groups of a phenyl group, a naphthyl group or the like, allylvinyl groups of a styryl group, a naphthylvinyl group or the like, and dialkylamino groups of dimethylamino group, diethylamino group or the like, are pointed out. Further, the alkyl component in these substituents may contain an ether group, an ester group, a cyano group, a sulfide group or the like.

$R^1$, $R^2$, $R^3$, $R^4$ and $R^5$ in the general formula (I), show an alkyl group, an aralkyl group, an aromatic hydrocarbon group, a heterocyclic ring group which may have a hydrogen atom or substituents. As specific examples of $R^1$ through $R^5$, lower alkyl groups of a methyl group, an ethyl group, a propyl group, a butyl group, a hexyl group or the like, aralkyl groups of a benzyl group, a phenethyl group, or the like, aromatic hydrocarbon groups of a phenyl group, a naphthyl group, an acenaphthyl group, an anthryl group, a pyrenyl group, or the like similar to A, heterocyclic group similar to A of a thienyl group, a bithienyl group, a carbazole group, an indolyl group, a furyl group, an indoline group or the like, are pointed out.

Further, as substituents which the respective organic groups of $R^1$ through $R^5$ may have, lower alkyl groups of a methyl group, an ethyl group, a propyl group, a butyl group, a hexyl group or the like, lower alkoxyl group of methoxy group, an ethoxy group, a butoxy group or the like, allyloxy groups of a phenoxy group, a trioxy group or the like, alialkoxy groups of a benzyloxy group, a phenethyloxy group or the like, substituent amino groups of a dimethylamino group, a diethylamino group, a phenylmethylamino group, a diphenylamino group or the like, are pointed out.

However, $R^1$ and A may together form a ring. As this example, an organic group shown by the general formulas and the like are pointed out.

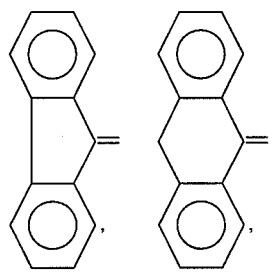

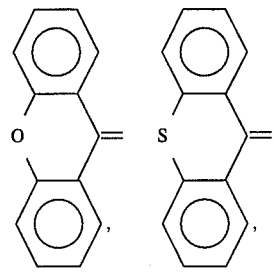

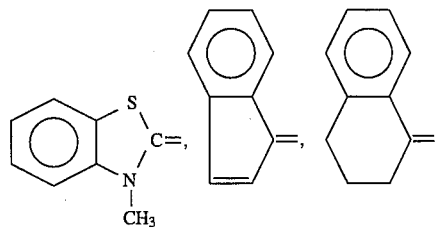

In the general formula (I), $R^6$ and $R^7$ show an alkyl group, an aralkyl group, an allyl group, an aromatic hydrocarbon group, or a heterocyclic group which may have substitutents. Specifically, $R^6$ and $R^7$ show lower alkyl groups of a methyl group, an ethyl group, a propyl group, a butyl group or the like, aralkyl groups of a benzyl group, a phenethyl group, a naphthylmethyl group or the like, aromatic hydrocarbon groupd of an allyl group, a phenyl group, a naphthyl group or the like, and heterocyclic groups of a pyridyl group, a thienyl group, a furyl group, a pyrrolyl group or the like. As substituents which these may have, the substituents similar to those in $R^1$, $R^2$, $R^3$, $R^4$ and $R^5$, are pointed out.

However, $R^6$ and $R^7$ may together form a ring, and as such an example, organic groups shown by the following general formulas and the like are pointed out.

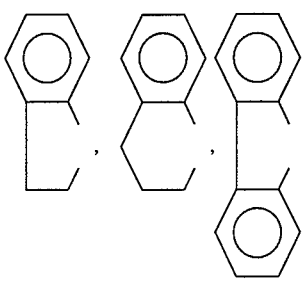

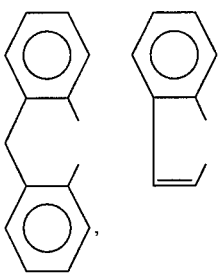

In the above general formula (I), l designates an integer of 0 or 1, m, an interior of 0, 1 or 2, and n, an integer of 1 or 2. Further, n is 1 when A is a monovalent group, and 2 when A is a divalent group.

Among the hydrazone compounds shown by the general formula (I), especially, a hydrazone compound wherein A is a carbazole ring, is preferable.

Several examples of the hydrazone compounds are shown as follows.

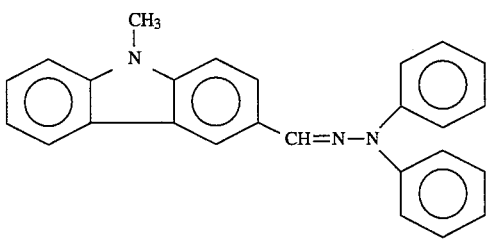

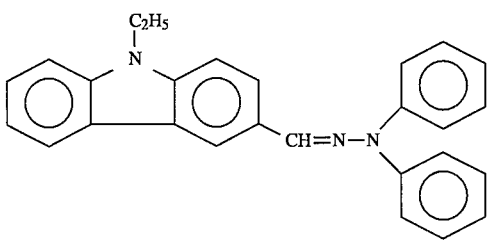

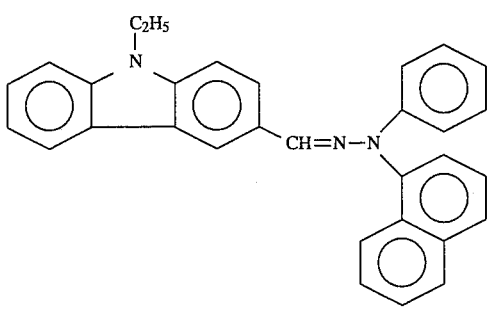

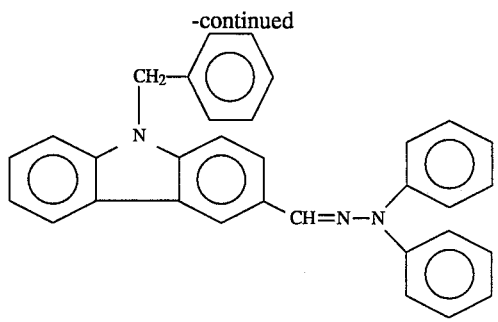

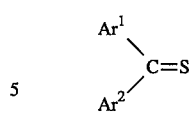

In the above general formula, $Ar^1$ and $Ar^2$ show an aromatic hydrocarbon group or an aromatic heterocyclic group which may have substituents, and specifically, the aromatic hydrocarbon group or the aromatic heterocyclic group as in A in the general formula (I) is pointed out.

Preferable thioketones are shown as follows.

Next, an explanation will be given to compounds having the memory property providing function.

The memory property can be achieved by a number of compounds. As representative compounds, for instance, a protonic acid such as chloroacetic acid, orthobenzoyl benzoic acid, a triarylmethanes such as aromatic diazonium salt, leuco crystal violet, leuco Malachite Green or the like, a halogenated hydrocarbon such as methane iodide, hexachloroethene, an aromatic halide compound of 1,3,5-tribromobenzene, 9,10-dichloroanthracene, 9,10-dibromoanthracene, a halogenated ketone compound of benzamide, nitrophenol, nitroaniline, hexachloroanthracene, bromoacetophenone, a halogenated acyl compound such as acetyl chloride, acetyl bromide, chlorobenzoyl chloride, and an acid anhydride such as phthalic anhydride, a thioketone, such as thio-Michler's ketone, are pointed out.

Especially, an aromatic halide compound wherein at least two chloride atoms and/or bromide atoms are substituted, or a thioketone shown by the following formula (II) is preferable.

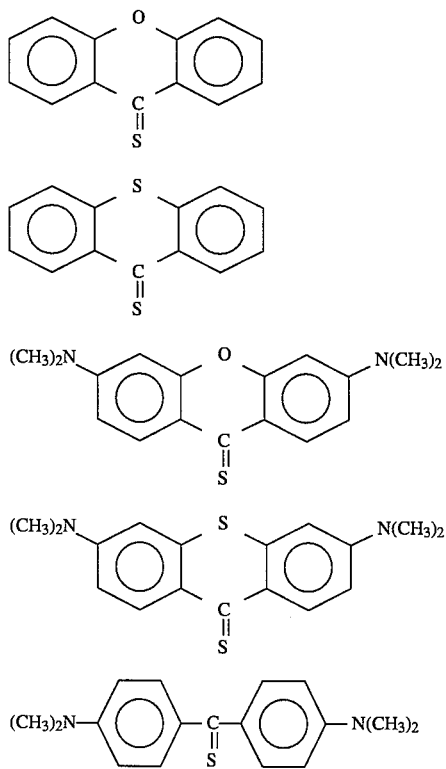

-continued

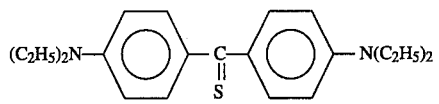

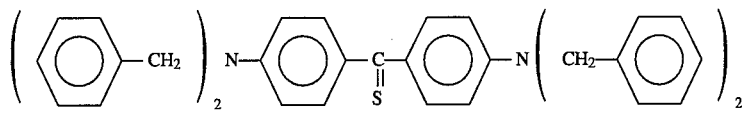

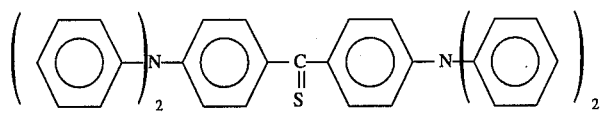

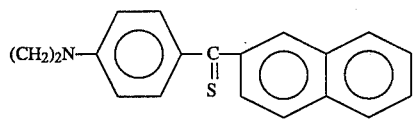

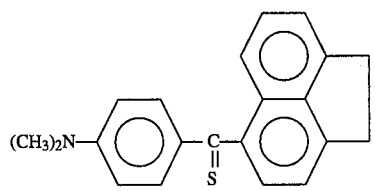

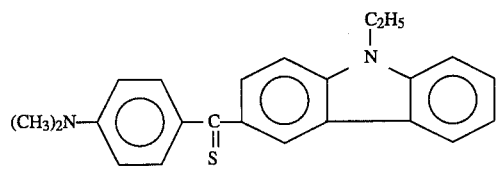

Next, an explanation will be given to binder resins. As a binder resin, a compound is preferable wherein the compatibility with a hole-transporting low molecular weight compound or the above compound having the memory property providing function and which does not impose a bad influence on the transport of electric charge carriers in a layer. For instance, polymer and a copolymer body of a vinyl compound such as styrene, vinylacetate, vinyl chloride, acrylate, methacrylate, butadiene and the like, polyvinylacetal, polycarbonate, polyester, polysulfone, polyphenylene oxide, polyurethane, cellulose ester, cellulose ether, alkyl resin, phenoxy resin, silicone resin and epoxy resin are pointed out. Among them, polyester resin, polycarbonate resin, methacrylate resin, acryl resin, and phenoxy resin are preferable, and especially, polycarbonate resin and methacrylate resin are preferable.

The amount of use of the binder resin is normally in a range of 0.1 through 30 weight times of the hole-transporting low molecular weight compound, preferably, 0.3 through 10 weight times thereof.

The memory layer and the optical information processing element of this invention is composed by dispersing a low molecular weight compound having the hole-transporting property and a compound having the memory property providing function in a binder. Further, the memory layer may include an additive such as a plasticizer, a surfactant, an ultraviolet ray absorber, an oxidation preventive agent, an electron acceptor or the like according to the necessity.

Next, an explanation will be given to a method of making an optical information processing element according to the present invention. In the optical information processing element of this invention, first, the respective components of the above memory layer and various additive components which are employed in accordance with the necessity, are dissolved in a solvent thereby forming an application liquid, the application liquid is coated on an electrode and is dried thereby forming the memory layer.

The film thickness of the memory layer is determined by ranges of the electric field intensity and the voltage of the power source, which are necessary for operating the optical information processing element, and which is normally not larger than 100 µm, preferably not larger than 30 µm. Further, the lower limit of the film thickness is not less than 0.01 µm, preferably not less than 0.1 µm, in view of providing uniformity of the film and preventing pinholes.

As a method for forming a photoelectric layer on the memory, other than the coating method, the vacuum deposition method, and the CVD method, a method of laminating a single molecule layer by the Langmuir-Brogett's (LB) Method (see "LB Film and Electronics", p.p. 1 to 15, p.p. 33 to 46, CMC, 1986) or the like, is pointed out.

Various forms of the photoelectric layer can be adopted by the above method. For instance, in case of employing selenium or silicon, the form can be an amorphous thin layer, or can be a thin layer composed of fine particles, or a thin layer wherein particles are dispersed or dissolved in a binder resin. Further, it is possible to form an LB film wherein several single molecular layers are laminated by the LB method. In case of the LB film, other than a film having a single photoconductive coloring matter, a film mixed with the photoconductive coloring matter and an insulative long-chain fatty acid such as arachic acid or a different coloring matter, and a single molecule film having a different mixture ratio may be laminated.

In a potoelectric layer wherein a photoconductive material is dispersed in a binder resin in a form of particle, as a binder resin, other than a butyral resin, a phenoxy resin, a phenol resin or the like which are the binder resin having hydroxyl groups which are excellent in the dispersion property of fine particles, polyester, polycarbonate, methacrylic resin, and the like are employed. In case of forming a photoelectric layer by the vapor deposition or the like, an operation or the like is carried out wherein the layer is exposed in a solvent vapor thereby changing the crystal system, if necessary, for enhancing further the converting efficiency.

Further, additives may be added to the photoelectric layer for promoting the paintability, the dispersion stability and the holding stability. Further, a photoconductive material having the carrier-transporting property may be added thereto. The thickness of the photoelectric layer depends on the method of making, which is in a range of several tens Å to several µm, and generally, preferably, is not larger than 1 µm.

In laminating the memory layer and the photoelectric layer, the above order of the procedure of steps is not always necessary and the memory layer may be formed on the photoelectric layer by the above method. Further, a method of making can be adopted wherein the memory layer and the photoelectric layer are formed on separate electrodes and integrated by crimping or the like. The lamination of electrodes may be performed by the crimping method, other than the sputtering method, the vapor-deposition method or the like.

The optical information processing element of this invention is employed by applying a voltage between the electrodes. In this case, in a dark state, the element is insulative and the dark current is provided with a very small value. However, in irradiating with light (input light) in a range of absorption wavelength of the photoelectric layer, the electricity-conductivity increases and the photocurrent is observed. Further, when the observation is performed after irradiating with a light (control light) in the absorption wavelength region of the memory layer for a constant time, the value of the dark current remains almost unchanged. However, when irradiated with the input light, the value increases or decreases compared with the value of the photocurrent which has been observed before the irradiation with the control light has been radiated for a constant time. That is, the response sensitivity of the element with respect to the input light changes by the irradiation with the control light, and the changed photosensitivity is stably held in the state wherein the voltage is applied. Accordingly, this element memorizes an information in a form of a change of the photosensitivity. The photosensitivity of the element can be controlled in an analogue form by the amount of radiating light, the number of radiations, the applied voltage and the like.

In the light radiation, it is necessary that the input light is absorbed by the photoelectric layer and influences on the memory layer as less as possible. And it is necessary that the control light is absorbed in the vicinity of an interface between the input layer and the memory layer. In this occasion, the input light and the control light may share the same wavelength or may be provided with different wavelengths, and the intensities of light may be the same or different. The light may be a monochromatic light or may be a light having a constant wavelength width.

The direction of incidence of light may be from the side of the memory layer or from the side of the photoelectric layer. For example, the following cases are pointed out.

(1) A case wherein the wavelength regions of the input light and the control light are different:

In this case, the input light is a light having the absorption wavelength region of the photoelectric layer, and the control light is a light having the absorption wavelength region of the memory layer.

In the case of the direction of incidence, wherein most of the input light and the control light are radiated from the side of the memory layer, it is necessary that the memory layer does not absorb the input light at all, or only a portion of the input light reaches the photoelectric layer, even when the absorption is carried out. Further, it is necessary that the control light reaches the vicinity of the interface joining the memory layer and the photoelectric layer. In case of the direction of incidence of light, wherein both the input light and the control light are radiated on the side of the photoelectric layer, it is necessary that the photoelectric layer does not absorb the control light at all, or a portion of the control light reaches the memory layer, even when the absorption is carried out.

When the direction of incidence of light is reversed between the input light and the control light, as in the above cases, the input light reaches the photoelectric layer and the control light reaches the interface joining the memory layer and the photoelectric layer.

In addition to the above conditions, it is preferable that the input light does not influence on the photosensitivity of the optical information processing element. In this case, the photosensitivity of the element can be monitored by the irradiation with the input light without influence on the photosensitivity which has been changed and held by the control light. That is, the control light can be employed for writing an information and the input light can be employed for reading an information.

(2) A case wherein the wavelength regions of the input light and the control light are the same:

The wavelength in this case corresponds to the absorption wavelength region of the memory layer, and at the same time, it is necessary that the wavelength is the absorption wavelength region of the photoelectric layer.

In case of the direction of the incidence of light, wherein both the input light and the control light are radiated from the side of the memory layer, it is necessary that a portion of the input light reaches the photoelectric layer , and it is necessary that the control light reaches the vicinity of the interface joining the memory layer and the photoelectric layer. Further, the photosensitivity of the element can be monitored by the input light with almost no influence on the photosensitivity of the element which has been changed and held by the control light, when the influence of the input light on the receiving sensitivity of the element is minimized by reducing the light intensity of the input light compared with the photosensitivity of the control light, or by sufficiently shortening the radiation time of the input light to a degree wherein the light receiving sensitivity of the element is not influenced thereby.

In case of the direction of incidence of light, wherein both the input light and the control light are radiated from the side of the photoelectric layer, it is necessary that the control light reaches the vicinity of the interface joining the memory layer and the photoelectric layer.

In case wherein the direction of incidence of light is reversed between the input light and the control light, the light receiving sensitivity of the element can be monitored with almost no influence on the photosensitivity of the element which has been changed and held by the control light when the control light is radiated from the side of the memory layer and the input light is radiated from the side of the photoelectric layer, and the input light does not influence on the vicinity of the interface joining the memory layer and the photoelectric layer.

Other than the above cases of (1) and (2), a method is possible wherein the input light and the control light are not differentiated with each other. The value of the photocurrent changes by each light radiation, when the light is employed which reaches the vicinity of the interface joining the memory layer and the photoelectric layer.

As stated above, the optical information processing element of this invention is employed by applying a voltage between the electrodes. The degree of change of the photosensitivity can be controlled by the amount of the electric field intensity applied between the electrodes in radiating the control light. In this case, the larger the electric field intensity, the more enhanced the rate of change of the photosensitivity of the element. It is necessary that the electric field intensity does not cause an insulating breakdown, which is generally not larger than $10^7$ V/cm, normally, not larger than $10^6$ V/cm, and preferably $5\times10^5$ V/cm.

Although the optical information processing element of this invention stably holds the photosensitivity which has been changed by the irradiation with the control light, it is possible to recover the element to its original state, and the element reversibly returns to its original state swiftly by heating the element at higher than the glass transition temperature. Accordingly, the repeated memory and erasure of the element are possible.

Next, an explanation will be given to a light-to-light converting device of this invention.

The light-to-light converting device of this invention is characterized by having an input optical information processing unit composed of a photoelectric layer and a memory layer having a function of holding an electricity-conductive property which has been changed by a constant wavelength of light even after shielding the light, and a display unit which is laminated thereon or electrically connected thereto.

The photoelectric layer composing the optical information processing unit is, similar to the photoelectric layer of the photo information processing element of this invention, formed by a photoconductive material which generates electron charge carriers by the separation of positive and negative electric charges by absorbing light, along with an insulative material such as a binder resin and a long chain alkyl fatty acid, a carrier-transporting material such as an aromatic amine and a hydrazone compound, and other additives. As the photoconductive material and other materials in use, the material similar to the photoelectric of the above light information treating element can be employed.

The thickness of the photoelectric depends on the method of making, which is in a range of several tens Å to several μm, preferably not larger than 1 μm, generally.

Further, the memory layer composing the input information treating unit is, similar to the memory layer of the photo information processing element of this invention as mentioned above, composed by dispersing a low molecular weight compound having the hole-transporting property which is provided with at least one nitrogen atom in the molecule and a compound or the like having the memory providing function which holds the electricity-conductive property which has been changed by the radiation of light, even after shielding light in a binder resin. As the low molecular weight compound having the hole-transporting property, a compound having the memory property providing function and other additives, a compound similar to the memory layer of the above photo information processing element can be employed.

The film thickness of the memory layer is determined by the ranges of the electric field intensity and the power source voltage which are necessary for operating the light-to-light converting device, which is normally not larger than 100 μm and preferably not larger than 30 μ m. Further, the lower limit of the film thickness is 0.01 μm, and preferably not smaller than 0.1 μm, in view of providing the uniformity of the painted film and preventing pinholes.

As the display unit which is laminated on or electrically connected to the input light information treating unit, a liquid crystal display unit, a light emitting diode (LED), an electroluminescence (EL) element, a Pockel's effect element or the like is pointed out.

As the liquid crystal display unit, a light-transmitting type or a light-reflecting type provided between electrodes at least one of which is provided with light-transmittance, is pointed out. The electrode may be of a uniform one or a patterned one. There is no special limitation for the material of the liquid crystal. As examples, a nematic liquid crystal, a chiral nematic liquid crystal, a cholesteric liquid crystal materials wherein these liquid crystal materials are dispersed in a polymer, a polymer liquid crystal having a liquid crystal unit at the main chain or the side chain of a polymer, are pointed out.

As the light emitting diode, a single heterojunction diode having only one junction wherein the energy gap is different as in GaAs/GaAlAs, a double heterojunction diode wherein a photoactivation layer is interposed between the p-layer and the n-layer having a large crystal mix ratio by employing GaAlAs, or the like is pointed out. It is possible to provide a wide coloring range from infrared region to visible region, and to provide a blue display unit by employing GaN, SiC, ZnS and the like.

As the electroluminescence element, a double insulating thin film element wherein a ZnS species fluorescent light emitting layer in a thin film form is interposed in a sandwich form by dielectric insulating layers such as of $Y_2O_3$, a powder dispersing type element wherein fine powders of a fluorescent body are dispersed in a dielectric substance, a fluorescent body layer which is an organic substance such as a quinolinol complex, and an organic element wherein an electric charge injecting layer is laminated, are pointed out.

Next, an explanation will be given to a method of the light-to-light converting device of this invention. As in the case of the aforementioned photo information processing element, first, in the light-to-light converting device of this invention, the respective components of the memory layer and various additive components which are employed in accordance with the necessity, are dissolved in a solvent thereby forming an application liquid, the application liquid is painted on the electrodes and dried thereby forming the memory layer.

Next, the photoelectric is laminated by a method of forming the photoelectric layer, wherein the respective components of the photoelectric layer are dissolved or dispersed in a solvent thereby forming an application liquid, which is coated on the memory layer and dried, a method of forming the photoelectric layer wherein the components are deposited on the memory layer by the vacuum deposition method, a method of forming the photoelectric layer on the memory layer by the Langmuir-Brogett's (LB) Method (see "LB Film and Electronics", p.p. 1 to 15, p.p. 33 to 46, CMC, 1986) or the like, thereby constructing the input information treating unit.

It is not always necessary that the lamination of the memory layer and the photoelectric layer is carried out in the above order. The memory layer may be formed on the photoelectric layer by the above method. Further, a method can be adopted wherein the memory layer and the photoelectric layer are separately formed on electrodes, which are integrated by crimping or the like. The electrode can be formed similarly by employing a material as in the above photo information processing element. The electrode may be formed by the sputtering method, the vapor deposition method or the crimping method. The film thickness of electrode is similarly and normally not less than 50 Å and not more than 100 μm.

The display unit may be laminated with the optical information processing unit, or electrically connected thereto in series without lamination. When the photo information processing unit and the display unit are laminated, an electrode may be interposed therebetween in accordance with the necessity.

For instance, in laminating the liquid crystal display unit, a method of forming the liquid crystal display unit, wherein the light-transmitting electrode substrate which is provided with a liquid crystal orientation layer or a polarizing layer in accordance with the necessity, is laminated opposingly to a film face of the input information treating unit or an electrode face or the like, interposing glass fiber spacers, and a liquid crystal is injected into a clearance formed as above, or a method wherein a liquid crystal layer is formed on the light-transmitting electrode which is provided with a liquid crystal orientation layer or a polarizing layer in accordance with the necessity, by painting, which is crimped to a film face of the optical information processing unit or an electrode face or the like, is pointed out. Further, an electrode layer, a light shielding layer, an orientation layer, a polarizing layer, and a dielectric mirror layer may be provided between the liquid crystal layer and the optical information processing unit in accordance with the necessity.

The light-to-light converting device of this invention is employed by applying in series a voltage on the optical information processing unit and the display unit. The degree of the change of the photosensitivity can be controlled by the degree of the electric field intensity applied on the optical information processing unit, in irradiating with the control light. At this occasion, the larger the electric field intensity applied on the optical information processing unit, the larger the rate of change of the photosensitivity. It is necessary that the electric field intensity applied on the optical information processing unit does not cause an insulation breakdown, which is generally not larger than $10^7$ V/cm, normally, $10^6$ V/cm, and preferably not larger than $5 \times 10^5$ V/cm.

Figure 1:
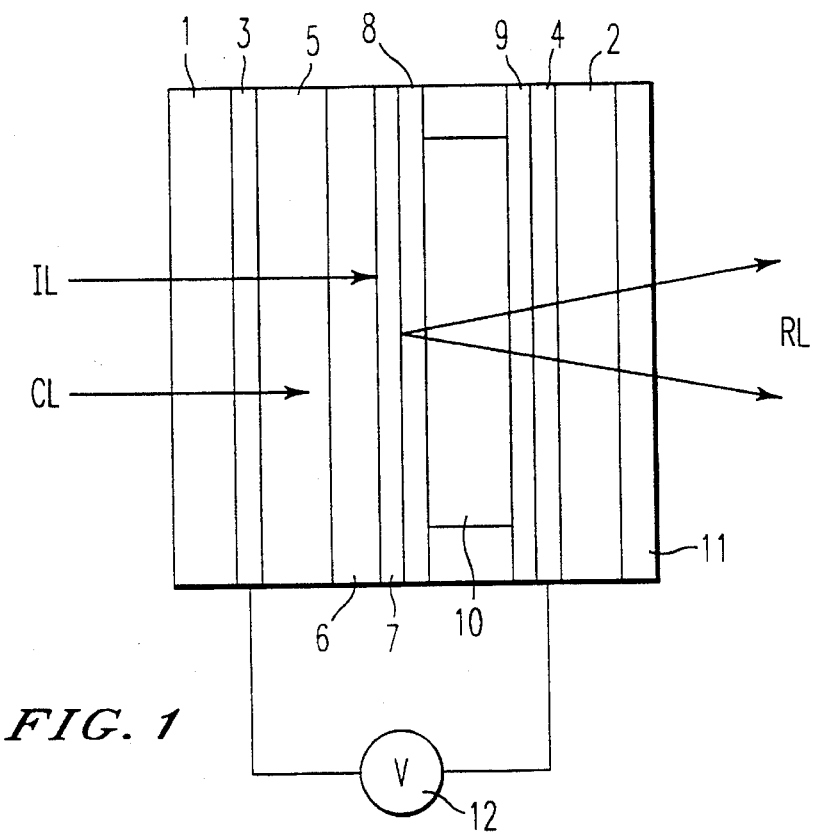

FIG. 1 shows an example of the construction of a light-to-light converting device of this invention. Reference numerals 1 and 2 designate glass plates, 3 and 4, light-transmitting electrodes, 5, a memory layer, 6, a photoelectric converting layer, 7, a dielectric mirror, 8 and 9, liquid crystal orientation layers, 10, a liquid crystal layer, 11, a polarizing layer, and 12, a power source. IL designates an input light, CL, a control light, and RL, a reading light.

Next, an explanation will be given to a method of operating the light-to-light converting device of this invention as shown in FIG. 1.

When a voltage is applied between the electrodes such that the side of the liquid crystal layer is a positive pole, in the dark state wherein the device is not radiated, the element is insulative and the dark current is very small. However, in irradiating with light (input light) in the absorption wavelength region of the photoelectric layer, the electricity-conductivity increases and the photocurrent is observed. Further, when the observation is performed after irradiating with light (control light) in the absorption wavelength region of the memory layer for a constant time, the value of the dark current remains almost unchanged, but when irradiated with the input light, the value increases or decreases compared with the bright current value which has been observed before irradiating with the control light for a constant time. That is, the response sensitivity of the optical information processing unit with respect to the optical changes by the irradiation with the control light, and the changed photosensitivity is held stably more than a day in a state wherein the voltage is applied. Accordingly, this device memorizes an information in a form of the change of the photosensitivity. The photosensitivity of the element can be controlled in an analogue form by the light radiation amount, the number of time of irradiation with the applied voltage and the like.

As stated above, the voltage applied on the display unit can be controlled by changing the photosensitivity of the photo information processing unit with respect to the input light. For instance, when the photosensitivity with respect to the input light increases by the control light, that is, when the impedance of the photo information processing unit in irradiating with light, is lowered, the voltage is controlled. For instance, when the photosensitivity with respect to the input light is increased by the control light, that is, when the impedance of the photo information processing unit in irradiating with light is lowered, the voltage applied on the display unit in irradiating with the input light is increased thereby, compared with a case before irradiating with the control light. When the total radiation amount of the control light reaches a certain value, the voltage applied on the display unit in irradiating with the input light exceeds the driving voltage of the display unit, for instance, in case of the liquid crystal display unit, the transmission is changed by the electro-optical effect of the liquid crystal. Accordingly, it is possible to provide an optical output by the reflection or the transmission by the reading light, and light emitting is observed in case of the display unit of an LED, an EL or the like.

It is necessary that the input light is absorbed by the photoelectric layer and influences on the memory layer as less as possible, and it is necessary that the control light is absorbed in the vicinity of an interface between the input layer and the memory layer. In this case, the photosensitivity which is changed and held by the control light does not influence on the input light. In this case, the input light and the control light may share the same wavelength or may be provided with different wavelengths, and the intensities of light may be the same or different. The light may be a monochromatic light or a light having a constant wavelength width. The direction of incidence of light may be on the side of the memory layer or the side of the photoelectric layer. Further, a method of employing the element is possible wherein the input light and the control light are not differentiated with each other, where the bright current value changes at every time of light radiation, by employing light which reaches the vicinity of an interface joining the memory layer and the photoelectric layer.

On the other hand, in case of employing the change of the transmission of the liquid crystal or the like by the electro-optical effect, with respect to the display unit, it is possible to perform the reading by radiating the reading light on the side of display unit, and by reading the reflected light from the dielectric mirror provided on a face joining to the optical information processing unit, or by an operation of radiating the reading light on the side of the optical information processing unit and reading the transmitted light. Further, when the display unit is a liquid crystal layer, radiating the input light from the side of the optical information processing unit, the input light may be employed as the reading light. In this case, a portion of the input light is absorbed by the photoelectric layer which causes the electro-optical conversion, and the input light which is not absorbed and transmitted through the photoelectric layer reaches the liquid crystal layer, thereby enabling to monitor the transmission of the liquid crystal layer.

The light-to-light converging device of this invention stably holds the photosensitivity which has been changed by the irradiation with the control light. However, the recovery thereof to its original state can be performed by heating. The device swiftly and reversibly recovers to its original state by heating the memory layer at higher than the glass transition temperature. Accordingly, the device can perform the repeated memory and erasure.

The mechanism of the light information treating element and the light-to-light converting device of this invention is not sufficiently clarified at the current time. However, the following assumption may be made. The low molecular weight compound having the hole-transporting property, the compound having the function of providing the memory property or the binder polymer or the like, in the memory layer, causes a state change, such as prototropy, isomerization, change in orientation or the like, by itself or between molecules by the irradiation with the control light, and changes of the polarization in the vicinity of the interface of the photoelectric layer and the memory layer, thereby lowering an energy barrier of the hole injection from the photoelectric layer, causing a change of facilitating the injection of holes which are created in irradiating with the input light to the photoelectric layer and increasing the bright current in irradiation with the input light. Further, the memory function is achieved by holding stably the changed state.

The optical information processing element of this invention is provided with the function wherein the photosensitivity is changed in an analogue form by irradiation, this state is stably memorized and held for a long period of time and the erasure the reversible memory can be performed by heating.

The light-to-light converting device of this invention is provided with the function wherein the photosensitivity is changed in an analogue form by irradiation with the control light, this state is memorized and held stably for a long time, and the erasure of the reversible memory can be performed by heating. Further, both the inputting and the outputting can be performed by light, and the output is provided with the nonlinearly.

Further, the optical information processing element and the light-to-light converting device of this invention employ mainly organic materials, and both the area expansion and downsizing are possible. Accordingly, their practical use is more improved than a conventional element for a neural network and a neurocomputer, and it can be expected that the element or the device is applicable to various usages such as calculation, image information processing, communication, a neurocomputer, a sensor and the like.

Now, the present invention will be described in further detail with reference to Examples. However, it should be understood that the present invention is by no means restricted to such specific Examples.

EXAMPLE 1

Making of an optical information processing element:

1.0 g of 9-ethylcarbazole-3-carbaldehydediphenylhydrazone, 12.5 mg of 4,4'-bis(dimethylamino)thiobenzophenone, 1.25 g of polycarbonate were dissolved in 14 g of dioxane thereby forming an application liquid.

The application liquid was coated on an ITO electrode layer which was formed on a glass substrate, and dried, thereby forming a memory layer.

Figure 2:
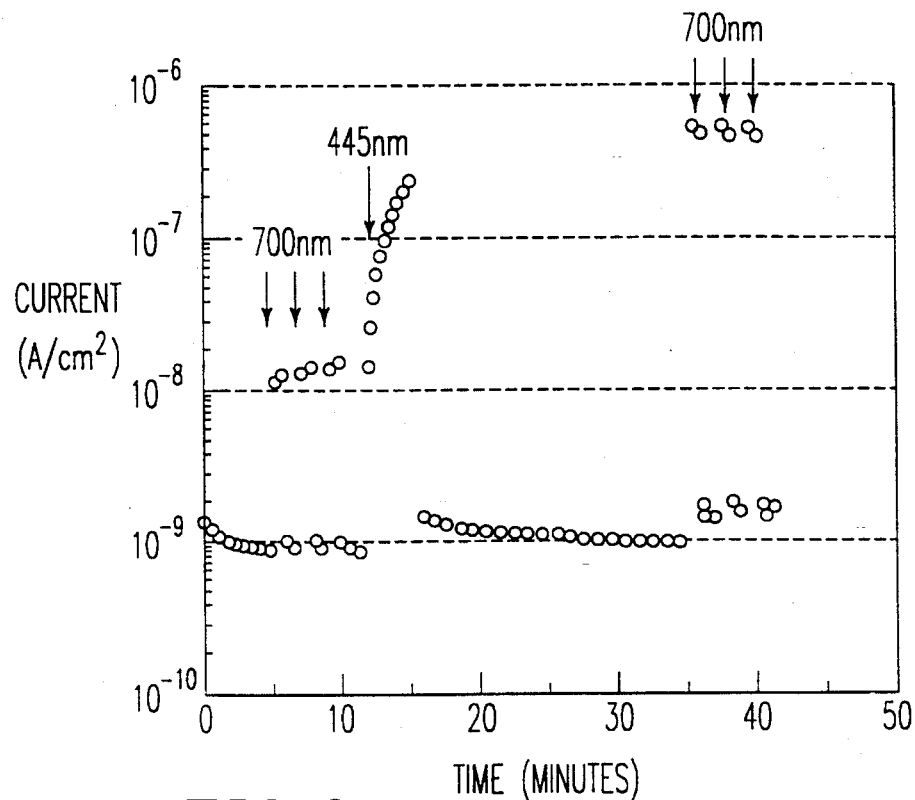
FIG. 2 is a diagram showing a current response characteristic with respect to an input light (700 nm), before and after irradiation with a control light (445 nm) of an optical information processing element which is manufactured by Example 1.

Next, 2 parts by weight of titanium phthalocyanin and 1 part by weight of polyvinylbutyral were mixed with a solvent wherein n-propylalcohol and methanol were mixed by weight ratios of 60:40, such that a ratio of a solid component was 3.4%, thereby forming a dispersion liquid. The dispersion liquid was coated on the memory layer, such that the film thickness after drying was approximately 0.1 µm and dried thereby forming a photoelectric layer. A counter electrode was formed on the surface of the photoelectric layer by vacuum-depositing aluminum, such that the active area of the electrode of the element was 1 cm$^2$, thereby forming an optical information processing element. Evaluation of the function of the light information treating element:

A direct current voltage of 30 V was applied on the optical information processing element with the side of the aluminum electrode as a positive pole, and a monochromatic light having the output of 100 µW/cm$^2$ and the wavelength of 700 nm was used to irradiate from the side of a transference electrode (ITO electrode) for 1 minute. Then, as shown in FIG. 2, a photocurrent of $1 \times 10^{-8}$ A/cm$^2$ was observed. After shielding light, irradiation with light of 700 nm was performed and a photocurrent having approximately the same degree was reproducibly observed. Next, when a monochromatic light of 445 nm was used to irradiate from the side of the transparence electrode for 5 minutes. Then, the photocurrent gradually increased and reached $3 \times 10^{-7}$ A/cm$^2$ after 5 minutes. After shielding light, the dark current recovers to the approximately original current value swiftly. When a monochromatic light of 700 nm was again used to irradiate from the side of the transparent electrode after 20 minutes, the photocurrent of $5 \times 10^{-7}$ A/cm$^2$ was reproducibly observed. That is, it was confirmed that the response sensitivity of the photocurrent with respect to the light of 700 nm increased approximately 50 times as much as the original value by irradiating with light of 445 nm. This increased response sensitivity was stable over time under room temperature, the value of which was held to 96% after 3 hours, 91% after 5 hours and 91% after 7 hours.

EXAMPLE 2

Making of an optical information processing element:

An optical information processing element was made as in Example 1.

Figure 3:
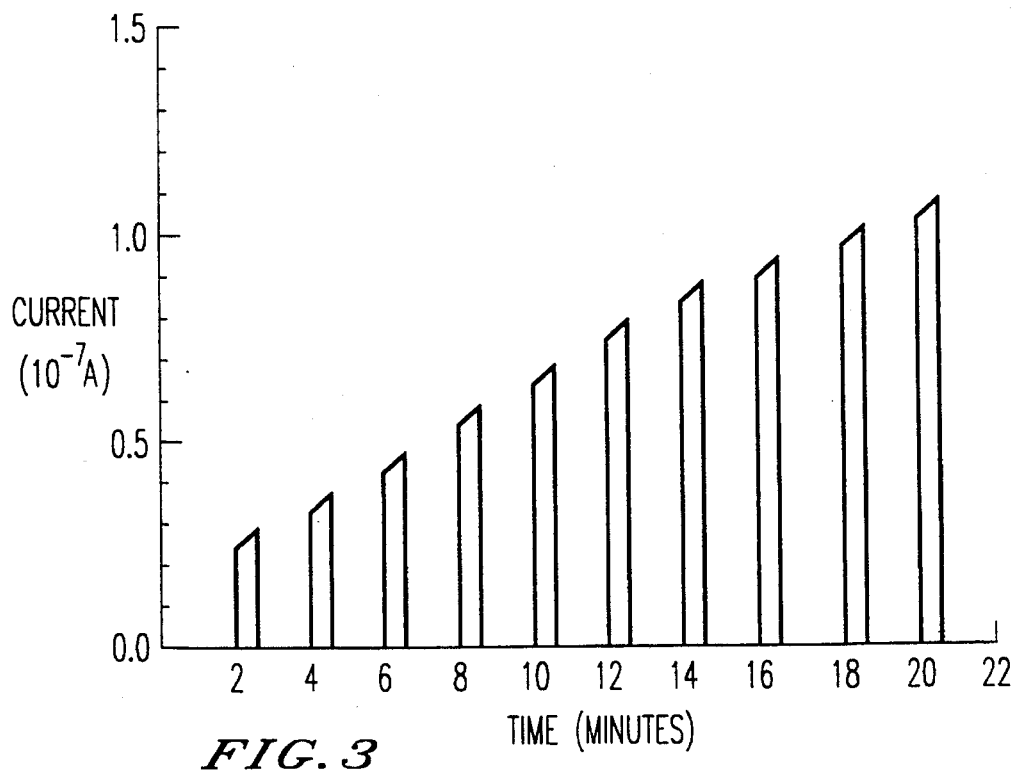
FIG. 3 is a diagram showing a current response characteristic to repeated light irradiation of an optical information processing element which is manufactured in Example 2.

Evaluation of the function of the optical information processing element:

A direct current voltage of 30 V was applied on the optical information processing element with the side of the aluminum electrode as a positive pole, a monochromatic light having the output of 100 µW/cm$^2$ and the wavelength of 445 nm was used to irradiate from the side of a transference electrode (ITO electrode) for 20 seconds. Then, the photocurrent of $3 \times 10^{-8}$ A/cm$^2$ was observed. After shielding light, the current recovered swiftly to its original dark current value. When light having the wavelength of 445 nm was repeatedly used to irradiate, as shown in FIG. 3, the photocurrent value gradually increased, and its value increased to $1\times10^{-7}$ A/cm$^2$ after 10 times of radiation. Accordingly, it was confirmed that the response sensitivity with respect to the light of 445 nm continuously increased by every repeated light radiation.

EXAMPLE 3

Making of an optical information processing element:

1.0 g of 9-ethylcarbazole-3-carbaldehydediphenylhydrazone, 12.5 mg of 4,4'-bis(dimethylamino)thiobenzophenone and 1.25 g of polycarbonate were dissolved in 14 g of dioxane thereby forming an application liquid.

The application was coated on an ITO electrode layer formed on a glass substrate such that the film thickness after drying was 3 μm, and dried thereby forming a memory layer.

Next, a chloroform solution was formed which contained respectively 1.0 mmol per 1 and 5.0 mmol per 1 of p-(10-carboxybenzyloxy)phenyltritolylporphyrin and arachidic acid, which was dropped on an aqueous solution including divalent cadmium salt in accordance with the Langmuir and Brogett's (LB) method, thereby forming a single molecular film. The film was compressed such that the surface pressure was 25 mN/m, and 36 layers of the films were laminated on the memory layer, thereby forming a photoelectric layer. Aluminum was vacuum-deposited on the surface of the photoelectric layer such that the active area of the electrode was 1 cm$^2$ thereby forming a counter electrode, by which the optical information processing element was made.

Figure 4:
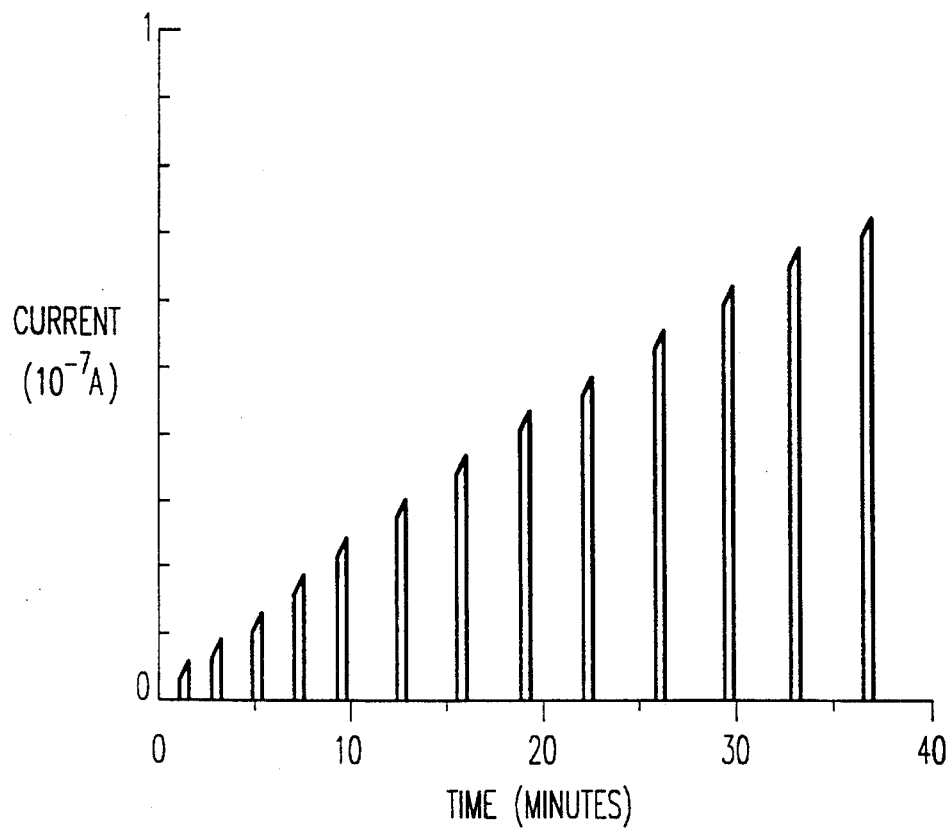
FIG. 4 is a diagram showing a current response characteristic to repeated light irradiations of an optical information processing element which is manufactured in Example 3.

Evaluation of the function of the optical information processing element:

A direct current voltage of 30 V was applied on the optical information processing element with the side of the aluminum electrode as a positive pole, and a monochromatic light having the output of 100 μW/cm$^2$ and the wavelength of 440 nm was used to irradiate from the side of a transference electrode (ITO electrode) for 10 seconds. Then, the photocurrent of $5\times10^{-9}$ A/cm$^2$ was observed. After shielding light, the current value recovered swiftly to its original dark current value. When light having the wavelength of 440 nm was repeatedly used to irradiate, as shown in FIG. 4, the photocurrent value gradually increased to $7\times10^{-8}$ A/cm$^2$ after 14 times of radiation. Accordingly, it was confirmed that the response sensitivity with respect to the light of 440 nm continuously increased at every repeated light irradiation.

EXAMPLE 4

Making of a light-to-light converting device:

1.0 g of 9-ethylcarbazole-3-carbaldehydediphenylhydrazone, 12.5 mg of 4,4'-bis(dimethylamino)thiobenzophenone and 1.25 g of polycarbonate were dissolved in 14 g of dioxane thereby forming an application liquid.

The application liquid was painted on an ITO electrode layer which was formed on a glass substrate such that the film thickness after drying was 3 μm, and was dried thereby forming a memory layer.

Next, 2 parts by weight of titanylphthalocyanin and 1 part by weight of polyvinylbutyral were mixed in a solvent wherein n-propylalcohol and methanol were mixed by weight ratios of 60:40, such that the solid component ratio was 3.4%, thereby forming a dispersion liquid. The dispersion liquid was coated on the memory layer such that the film thickness after drying was approximately 0.1 μm, and dried thereby forming a photoelectric layer. Aluminum was vacuum-deposited on the surface of the photoelectric layer thereby forming a counter electrode, on which a dielectric mirror layer was laminated, and a polyimide film applied with the orientation treatment was coated.

On the other hand, an ITO substrate was separately prepared, the surface was coated with a polyimide film applied with the orientation treatment, and the ITO substrate was laminated oppositely on a treating face of a cell formed as above interposing glass fiber spacers of 10 μm. A liquid crystal of a schiff base group compound was injected into a clearance formed as above, and the liquid crystal layer was sealed by fixing the surrounding by epoxy resin. Further, a polarizing plate was laminated on the outside of the ITO substrate applied with the orientation treatment, thereby making a light-to-light converting device of this invention.

Figure 5:
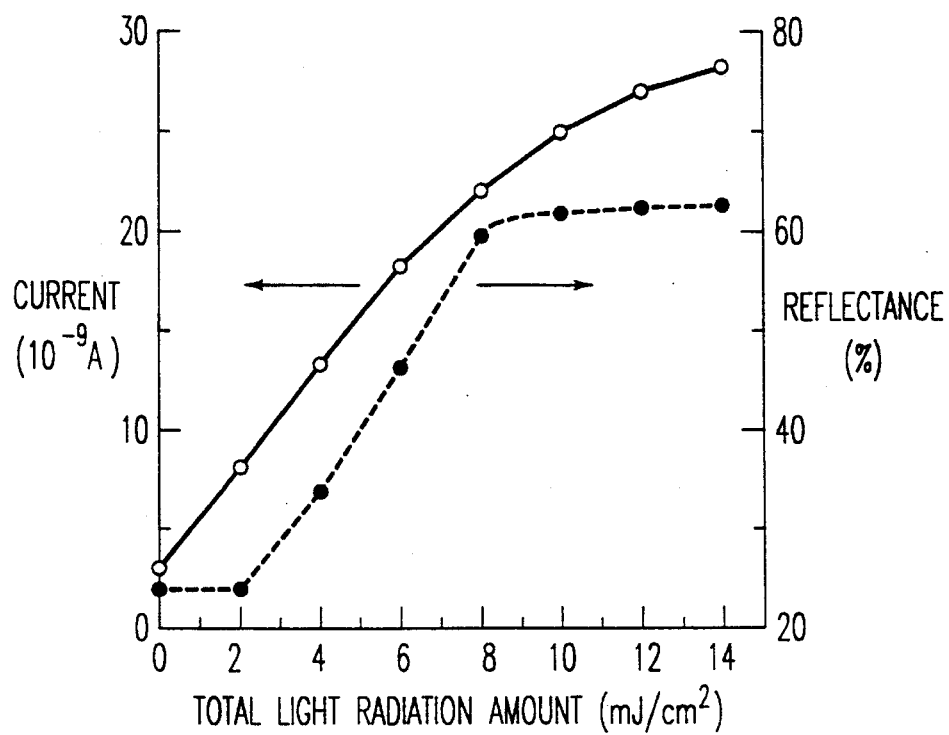
FIG. 5 is a diagram showing an operational characteristic of a light-to-light converting device which is manufactured by Example 4.

Evaluation of the function of the light-to-light converting device:

A direct current bias voltage of 30 V was applied on the device such that the side of the ITO electrode on the side of the liquid crystal of the light-to-light converting device was a positive pole. With respect to this element, an operation wherein a monochromatic light having the output of 77 μW/cm$^2$ and the wavelength of 700 nm was used to irradiate as the input light from the side opposite to the side of the liquid crystal for 1 minute, and an operation of irradiating with a monochromatic light having the output of 77 mW/cm$^2$ and wavelength of 445 nm was radiated as the control light for 26 seconds (2.0 mJ/cm$^2$), were alternately repeated at intervals of 2 minutes. As shown by the bold line in FIG. 5, the photocurrent value when the input light was used to irradiate for 1 minute increased with an increase in the total irradiation amount.

When the visible light reflectance of the liquid crystal layer after irradiating with the input light for 30 seconds, was monitored, the driving of the liquid crystal was not observed at the time point wherein the total irradiation amount of the control light was not larger than 2 mJ/cm$^2$, however, the driving was initiated at the time point when the total irradiation amount exceeds 4 mJ/cm$^2$, and the reflectance was saturated when the total radiation amount was equal to or more than 8 mJ/cm$^2$.

EXAMPLE 5

Making of a light-to-light converting device:

1.0 g of 9-ethylcarbazole-3-carbaldehydediphenylhydrazone, 12.5 mg of 4,4'-bis(dimethylamino)thiobenzophenone and 1.25 g of polycarbonate were dissolved in 14 g of dioxane thereby forming an application liquid.

The application liquid was coated on an ITO electrode layer which was formed on a glass substrate such that the film thickness after drying was 3 μm, and was dried thereby forming a memory layer.

Next, 2 parts by weight of titanylphthalocyanin and 1 part by weight of polyvinylbutyral were mixed with a solvent wherein n-propylalcohol and methanol were mixed by weight ratios of 60:40, such that the solid component ratio was 3.4%, thereby forming a dispersion liquid. The dispersion liquid was painted on the memory layer such that the film thickness after drying was approximately 0.1 μm, and dried thereby forming photoelectric layer, on which aluminum was vacuum-deposited thereby forming an upper electrode, by which an optical information processing unit was formed.

On the other hand, a twisted nematic liquid crystal cell was separately prepared, which was electrically connected to the optical information processing unit in series, thereby making a light-to-light converting device.

Figure 6:
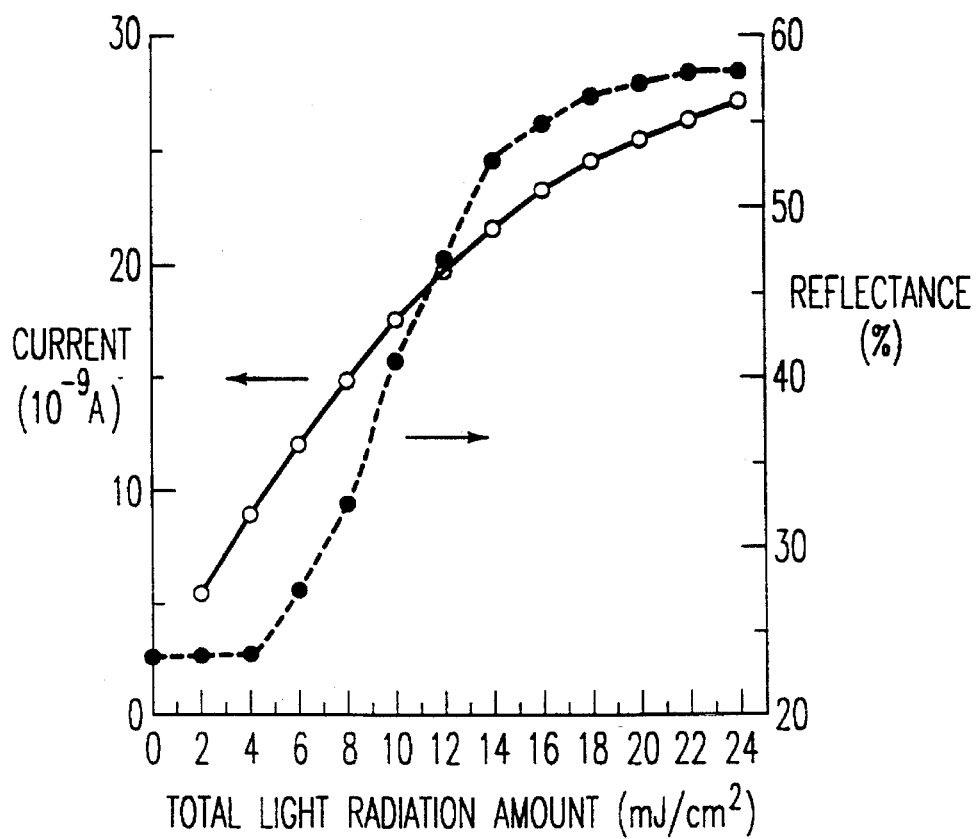
FIG. 6 is a diagram showing an operational characteristic of a light-to-light converting device which is manufactured by Example 5.

A direct current bias voltage of 30 V was applied on the device such that the side of the liquid crystal of the light-to-light converting device was a positive pole. A monochromatic light having the output of 77 µW/cm² and the wavelength of 450 nm was used to irradiate from the side opposite to the side of the liquid crystal for 26 seconds (light radiation amount 2.0 mJ/cm²) and an operation monitoring the reflectance of the liquid crystal was performed. This operation was repeated for 12 times at intervals of 1 minute. FIG. 6 shows the result of monitoring the photocurrent value of the element and the reflectance of the liquid crystal layer. The photocurrent increased at every repeated light irradiation. On the other hand, the reflectance of the liquid crystal remained constant when the total light irradiation amount was not larger than 4 mJ/cm² and no driving of the liquid crystal was observed, however, the reflectance gradually increased when the total light irradiation amount was equal to or more than 6 mJ/cm², and the reflectance was saturated when the total light irradiation amount was equal to or more than 18 mJ/cm².

What is claimed is:

1. An optical information processing element characterized by having a photoelectric and a memory layer, said memory layer being provided with a function holding an electricity-conducting property which has been changed by irradiation with light having a constant wavelength even after shielding the light, said photoelectric and said memory layer being disposed between electrodes, at least one of said electrodes is provided with a light-transmitting property.

2. The optical information processing element according to claim 1, further comprising a voltage application means between the electrodes.

3. The optical information processing element according to claim 1, wherein the electrode is selected from the group consisting of a metal, a metal oxide, copper iodide, carbon black, an electrically conductive resin and combinations thereof.

4. The optical information processing element according to claim 1, wherein the electrode having a light transmitting property has the transmittance of 10 to 100%, in a wavelength region of light which the memory layer and the photoelectric layer absorb.

5. The optical information processing element according to claim 1, wherein said element includes a single memory layer provided with said function of holding an electricity-conducting property.

6. The optical information processing element according to claim 1, wherein the photoelectric layer includes a photoconductive material.

7. The optical information processing element according to claim 6, wherein said photoelectric layer includes a binder resin.

8. The optical information processing element according to claim 6, wherein the photoconductive material is selected from the group consisting of amorphous silicon, cadmium sulfide, zinc oxide, an organic pigment and combinations thereof.

9. The optical information processing element according to claim 8, wherein the organic pigment is selected from the group consisting of a phthalocyanin group, an azo group, a porpylin group, a cyanin group, a mercyanin group, a pyrilium group, a thiapyrilin group, a triarylmethane group, a squarylium group, an azulenium group, a perylene group, a polycyclic quinone group, a pyrrolopyrrole group and combination thereof.

10. The optical information processing element according to claim 1, wherein the memory layer includes a hole-transporting compound or compounds, a compound or compounds having a function providing changes in an electricity-conducting property of said memory layer after irradiation and a binder resin.

11. The processing information optical element according to claim 10, wherein the compound having a memory property providing function is selected from the group consisting of a protonic acid, a halogenated hydrocarbon, an aromatic halide component, a halogenated ketone compound, a halogenated acyl compound, a thioketone and combinations thereof.

12. The optical information processing element according to claim 10, wherein the compound having a memory property providing function is a thioketone shown by the following chemical formula:

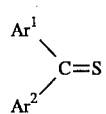

where each of $Ar^1$ and $Ar^2$ shows an aromatic hydrocarbon group or an aromatic heterocyclic group.

13. The optical information processing element according to claim 12, wherein said aromatic heterocyclic ring has substituents.

14. The optical information processing element according to claim 12, wherein said $Ar^1$ and $Ar^2$ are bonded to each other.

15. The optical information processing element according to claim 10, wherein the hole-transporting compound is selected from the group consisting of an amino group, a hydroazo group, a hydrazine group, a heterocyclic ring and combinations thereof.

16. The optical information processing element according to claim 15, wherein the hole-transporting compound is a hydrazone compound shown by the following chemical formula:

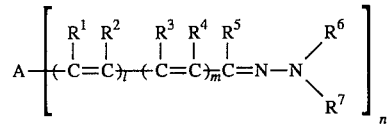

where A is a monovalent or divalent organic group including at least one of an aromatic hydrocarbon ring and an aromatic heterocyclic ring; $R^1$ through $R^5$ respectively show a hydrogen atom, an alkyl group, an aralkyl group, an aromatic hydrocarbon group, or a heterocyclic group; $R^1$ and A may together form a ring; $R^6$ and $R^7$ show respectively an alkyl group, an aralkyl group, an allyl group, an aromatic hydrocarbon group or a heterocyclic group; l is an integer of 0 or 1, m is an integer of 0, 1 or 2, and n is an integer of 1 or 2.

17. The optical information processing element according to claim 16, wherein said aromatic heterocyclic ring has substituents.

18. The optical information processing element according to claim 16, wherein $R^1$ through $R^5$ show said heterocyclic group having substituents.

19. The optical information processing element according to claim 16, wherein $R^6$ and $R^7$ show said heterocyclic group having substituents.

20. The optical information processing element according to claim 16, wherein $R^6$ and $R^7$ together form a ring.

* * * * *